US011098679B2

(12) United States Patent
Uchida

(10) Patent No.: US 11,098,679 B2
(45) Date of Patent: Aug. 24, 2021

(54) SEALING VALVE FOR FUEL VAPOR PROCESSING APPARATUS

(71) Applicant: HAMANAKODENSO CO., LTD., Kosai (JP)

(72) Inventor: Kimio Uchida, Kariya (JP)

(73) Assignee: HAMANAKODENSO CO., LTD., Kosai (JP)

( * ) Notice: Subject to any disclaimer, the term of this patent is extended or adjusted under 35 U.S.C. 154(b) by 0 days.

(21) Appl. No.: 16/918,194

(22) Filed: Jul. 1, 2020

(65) Prior Publication Data

US 2021/0003102 A1 Jan. 7, 2021

(30) Foreign Application Priority Data

Jul. 4, 2019 (JP) .............................. JP2019-125581

(51) Int. Cl.
*F02M 25/08* (2006.01)
(52) U.S. Cl.
CPC .............................. *F02M 25/0836* (2013.01)
(58) Field of Classification Search
CPC .......... F02M 25/0836; B60K 15/03519; B60K 15/03504
See application file for complete search history.

(56) References Cited

U.S. PATENT DOCUMENTS

| 1,963,054 | A | * | 6/1934 | Powers | A47C 23/0438 5/256 |
| 4,298,297 | A | * | 11/1981 | Courson | F16B 37/12 411/262 |
| 6,443,629 | B1 | * | 9/2002 | Novacoski | G02B 6/3821 385/55 |
| 10,738,907 | B2 | * | 8/2020 | Courth | F16K 31/0696 |
| 2015/0144111 | A1 | | 5/2015 | Akita et al. | |
| 2016/0208830 | A1 | * | 7/2016 | Boyd | E21B 43/121 |

* cited by examiner

*Primary Examiner* — Xiao En Mo
(74) *Attorney, Agent, or Firm* — Nixon & Vanderhye P.C.

(57) ABSTRACT

A valve guide moves back and forth relative to a housing. A valve engages with and slides on the valve guide to open and close a sealing passage of the housing. A valve-side spring is sandwiched between the valve guide and the valve and biases the valve. The valve-side spring has an outer wire portion defining a flat surface at a distal end in an axial direction and that is orthogonal to the axial direction. A pitch between the outer wire portion and an adjacent wire portion adjacent to the outer wire portion is smaller than a pitch between regular wire portions in at least one end of the valve-side spring in the axial direction. The outer wire portion and the adjacent strand portion are in line contact with each other in a circumferential direction.

3 Claims, 5 Drawing Sheets

US 11,098,679 B2

SEALING VALVE FOR FUEL VAPOR PROCESSING APPARATUS

CROSS REFERENCE TO RELATED APPLICATION

The present application claims the benefit of priority from Japanese Patent Application No. 2019-125581 filed on Jul. 4, 2019. The entire disclosures of all of the above applications are incorporated herein by reference.

TECHNICAL FIELD

The present disclosure relates to sealing valve for a fuel vapor processing apparatus for a vehicle.

BACKGROUND

In a vehicle having an internal combustion engine, liquid fuel is stored in a fuel tank and is to be used for the internal combustion engine.

SUMMARY

According to an aspect of the present disclosure, a sealing valve is for a fuel vapor processing apparatus provided in a vehicle. The vehicle includes an internal combustion engine and a fuel tank. The fuel vapor processing apparatus includes a canister configured to adsorb evaporated fuel evaporated in the fuel tank. The sealing valve is configured to be provided in a purge pipe that connects the fuel tank to the canister. The sealing valve comprises a housing. The sealing valve further comprises a valve guide configured to convert a rotational force of an actuator into a propulsive force and to move back and forth relative to the housing. The sealing valve further comprises a valve connected to the purge pipe and configured to engage with and to slide on the valve guide to open and close a sealing passage of the housing. The sealing valve further comprises a valve-side spring sandwiched between the valve guide and the valve and configured to bias the valve in a direction to close the sealing passage. The valve-side spring includes a wire element that is in a spiral form.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
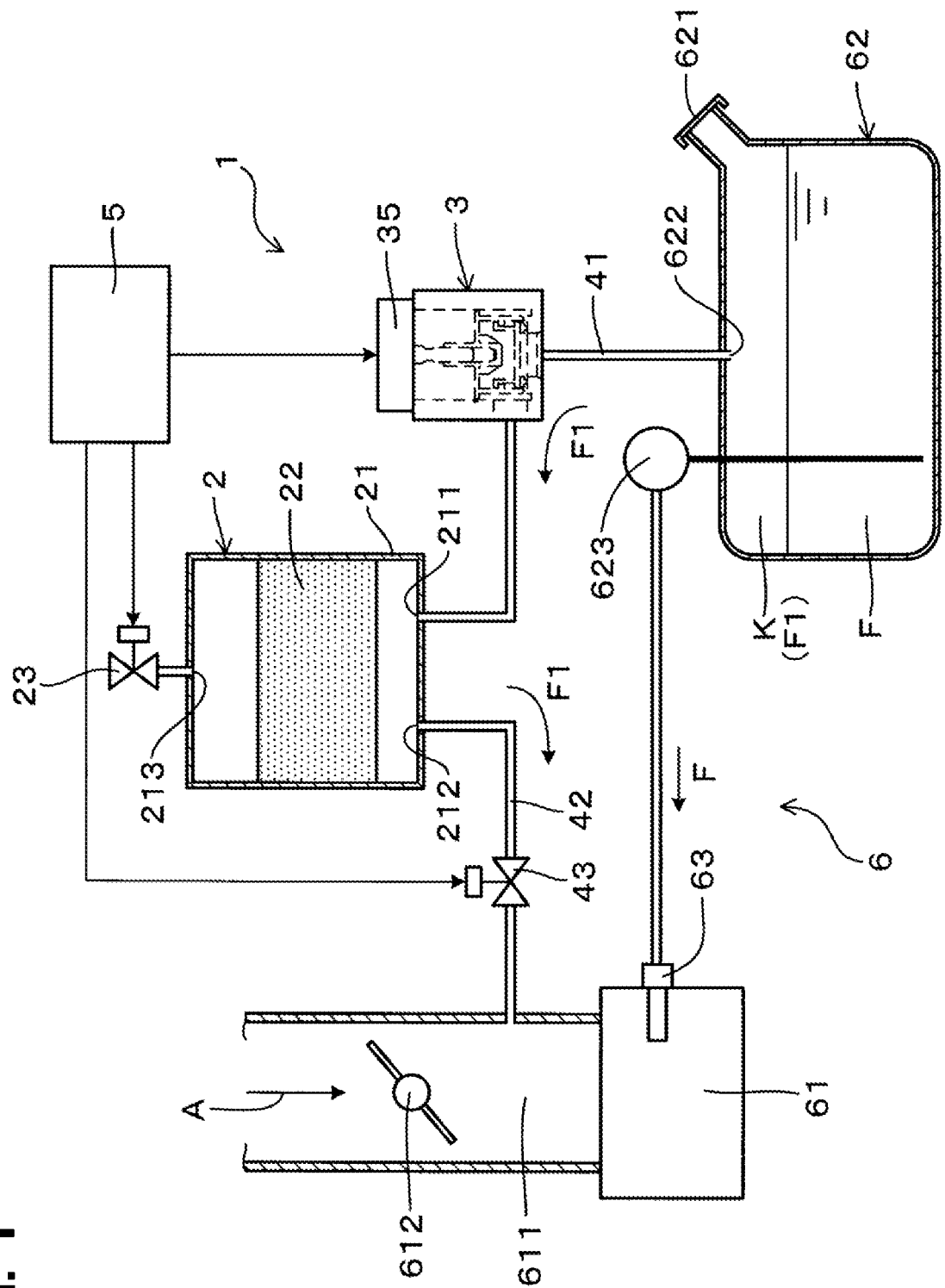
FIG. 1 is an explanatory diagram illustrating a part of a vehicle in which a fuel vapor processing apparatus according to an embodiment is placed.

As follows, examples of the present disclosure will be described.

According to an example of the present disclosure, a vehicle is equipped with a fuel tank that reserves liquid fuel that is to be used for the internal combustion engine. Liquid fuel in the fuel tank is at a vapor pressure that varies according to temperature. Further, among the various gas phase components in the fuel tank, pressure is exerted due to evaporated fuel or the like. When fuel is supplied to the fuel tank, in some cases, evaporated fuel, which is part of the gas phase components in the fuel tank, is desirably not released to the outside.

According to an example of the present disclosure, a vehicle is equipped with a fuel vapor processing apparatus including a canister that adsorbs evaporated fuel.

According to an example of the present disclosure, a sealing valve is provided in a purge pipe, which connects the fuel tank to the canister. Before starting fuel supply to the fuel tank, the sealing valve is opened to adsorb fuel vapor in the fuel tank into an adsorbent in the canister. The fuel components adsorbed by the adsorbent of the canister is, for example, supplied to the intake pipe of the internal combustion engine and is used for combustion of the internal combustion engine. Further, fuel vapor in the fuel tank is, for example, supplied to an intake pipe of the internal combustion engine through the canister.

According to an example of the present disclosure, the sealing valve used in the fuel vapor processing apparatus is a normally close sealing valve that closes the purge pipe connecting the fuel tank to the canister. In response to a signal sent from a control device to an actuator of the sealing valve, the sealing valve opens the purge pipe. The open-close operation of the purge pipe by using the sealing valve includes a scheme where the opening degree is not adjusted, a scheme where the opening degree is adjusted in two steps, and a scheme where the opening degree is quantitatively adjusted.

According to an example of the present disclosure, a fuel vapor processing apparatus quantitatively adjusts an opening degree of a sealing valve by using a stepping motor. This fuel vapor processing apparatus is configured, when a fuel tank is depressurized, to change a stroke amount of a closing valve that is a sealing valve thereby to adjust a flow rate of gas flowing through the purge pipe from the fuel tank to the canister. Then, the fuel vapor processing apparatus feedback-controls the stroke amount of the blocking valve so that a deviation between a target internal pressure and an actual internal pressure of the fuel tank becomes small.

Further, according to an example of the present disclosure, the sealing valve may include a housing, a valve guide, a valve, and a spring. The housing has an inflow-outflow passage connected to a purge pipe. The valve guide converts a rotational force of the stepping motor into a propulsive force thereby to move back and forth. The valve is slidable on and engaged with the valve guide to open and close the inflow-outflow passage. The spring biases the valve in a direction to close the inflow-outflow passage. The spring used for the sealing valve is, in many cases, a compression coil spring formed by winding a round wire that is a wire element.

According to an example of the present disclosure, flat surfaces may be formed on both ends of the spring, respectively, by polishing (grinding) part of the end of the round wire.

More specifically, for example, each of the polished parts in the circumferential direction at both ends of the spring is within a range of a predetermined angle in the circumferential direction from the distal end side of the round wire. In the polished portion in the circumferential direction, the thickness of the round wire is thinly deformed in the axial direction, and its spring constant varies at each portion of the spring in the circumferential direction. As a result, when the spring is compressed, the biasing force applied to the valve from portions of the spring in the circumferential direction varies. Therefore, in order to ensure the sealing of the inflow-outflow passage by using the valve, there may be a room to make further consideration of the structure of the sealing valve.

According to an example of the present disclosure, a sealing valve is for a fuel vapor processing apparatus provided in a vehicle. The vehicle includes an internal combustion engine and a fuel tank. The fuel vapor processing apparatus includes a canister configured to adsorb evaporated fuel evaporated in the fuel tank. The sealing valve is configured to be provided in a purge pipe that connects the fuel tank to the canister. The sealing valve comprises a housing. The sealing valve further comprises a valve guide configured to convert a rotational force of an actuator into a propulsive force and to move back and forth relative to the housing. The sealing valve further comprises a valve connected to the purge pipe and configured to engage with and to slide on the valve guide to open and close a sealing passage of the housing. The sealing valve further comprises a valve-side spring sandwiched between the valve guide and the valve and configured to bias the valve in a direction to close the sealing passage. The valve-side spring includes a wire element that is in a spiral form and has outer wire portions located at both ends in an axial direction, respectively. Each of the outer wire portions has an outer surface located at a distal end in the axial direction and defining a flat surface that is orthogonal to the axial direction. A pitch between the outer wire portion and an adjacent wire portion, which is adjacent to the outer wire portion, is smaller than a pitch between regular wire portions of the wire element, which are other than the outer wire portion and an adjacent wire portion, in at least one end of the valve-side spring in the axial direction. The outer wire portion and the adjacent strand portion are in line contact with each other in a circumferential direction.

In the sealing valve of the evaporated fuel processing apparatus according to the example, the valve-side spring having the shape may enable to more reliably seal the sealing passage by using the valve. Specifically, in the spiral wire element that forms the valve-side spring, the outer surface of the outer wire portion located at each of both the distal ends in the axial direction is a flat surface orthogonal to the axial direction. Due to formation of the flat surface, the thickness of the portion of the outer wire in the axial direction, in which the flat surface is formed in the circumferential direction, is smaller than the thickness of the portion in the axial direction in which the flat surface is not formed.

Therefore, in at least one end portion of the valve-side spring in the axial direction, a pitch between an outer wire portion of the valve-side spring and the adjacent wire portion of the valve-side spring is smaller than the pitch of the other regular wire portion. Thus, the outer wire portion and the adjacent wire portion are in line contact with each other in the circumferential direction. In addition, in at least one end portion of the valve-side spring in the axial direction, in which the flat surface is formed in the circumferential direction of the outer wire portion, the outer wire portion and the adjacent wire portion overlap in the axial direction, i.e., are stacked one another in the axial direction. This configuration alleviates occurrence of variation in the spring constant in portions of the valve-side spring in the circumferential direction. Thus, when the valve-side spring is compressed, this configuration enables to reduce variation in the biasing force, which is applied to the valve from portions of the valve-side spring in the circumferential direction.

Therefore, the sealing valve of the evaporated fuel processing apparatus according to this aspect enables the valve to more reliably seal the sealing passage.

Embodiment of a sealing valve of a fuel vapor processing apparatus will be described with reference to drawings.

(Embodiment)

As shown in FIG. 1, an evaporated fuel processing apparatus 1 according to the present embodiment is provided in a vehicle 6 that includes an internal combustion engine 61 and a fuel tank 62. The evaporated fuel processing apparatus 1 includes a canister 2, which adsorbs evaporated fuel F1 evaporated in the fuel tank 62, and a sealing valve 3 provided in a first purge pipe 41 that extends from the fuel tank 62 to the canister 2.

Figure 2:
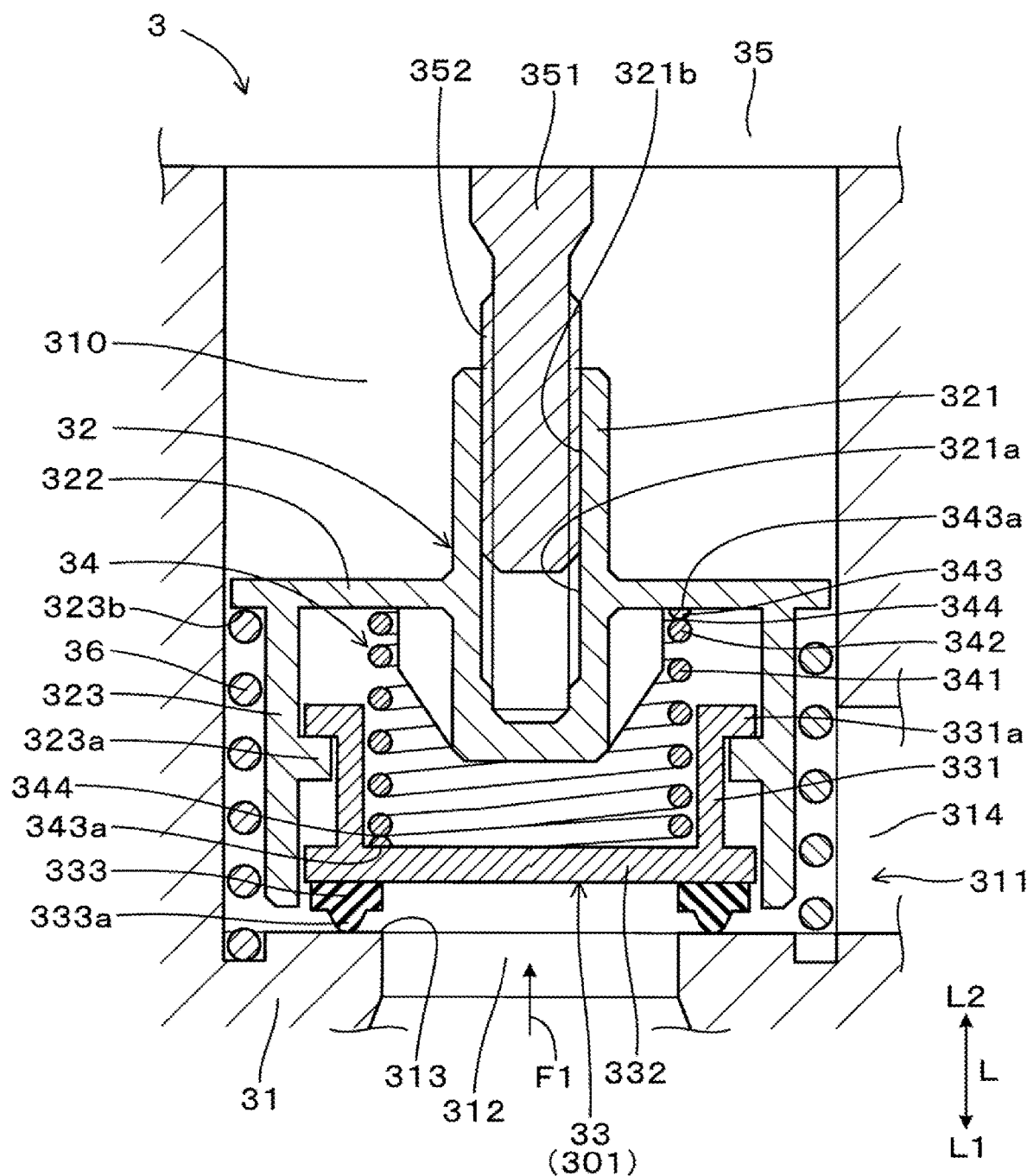
FIG. 2 is an explanatory diagram illustrating a sealing valve in a closed position in the fuel vapor processing apparatus according to the embodiment.
Figure 3:
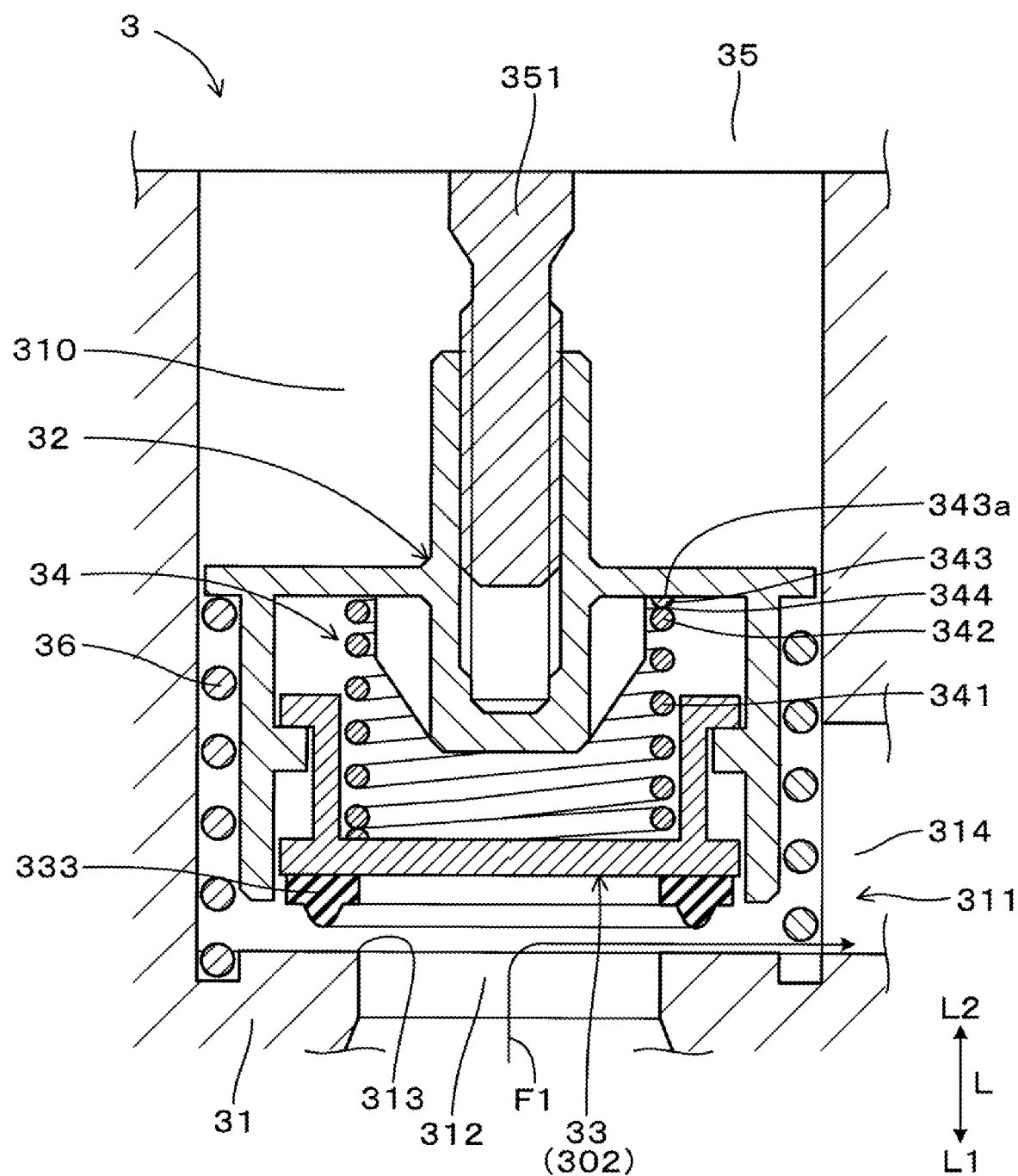
FIG. 3 is an explanatory diagram illustrating the sealing valve in an opened position in the fuel vapor processing apparatus according to the embodiment.

As shown in FIGS. 2 and 3, the sealing valve 3 of the present embodiment includes a housing 31, a valve guide 32, a valve 33, and a valve-side spring 34. The housing 31 forms a case of the sealing valve 3 and includes a sealing passage 311 that is connected to the first purge pipe 41. The valve guide 32 is configured to convert a rotational force of a stepping motor 35 that is an actuator into a propulsive force thereby movable back and forth with respect to the housing 31. The valve 33 is slidable and is engaged with the valve guide 32 and is configured to open and close the sealing passage 311 of the housing 31.

Figure 4:
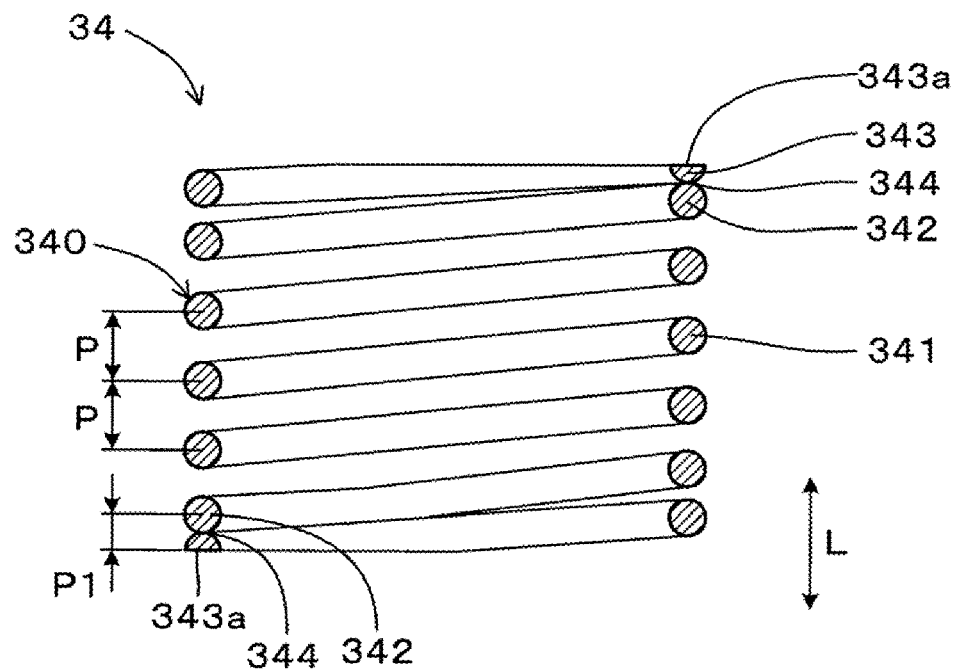
FIG. 4 is an explanatory view illustrating a cross section of a valve-side spring of the sealing valve according to the embodiment.
Figure 5:
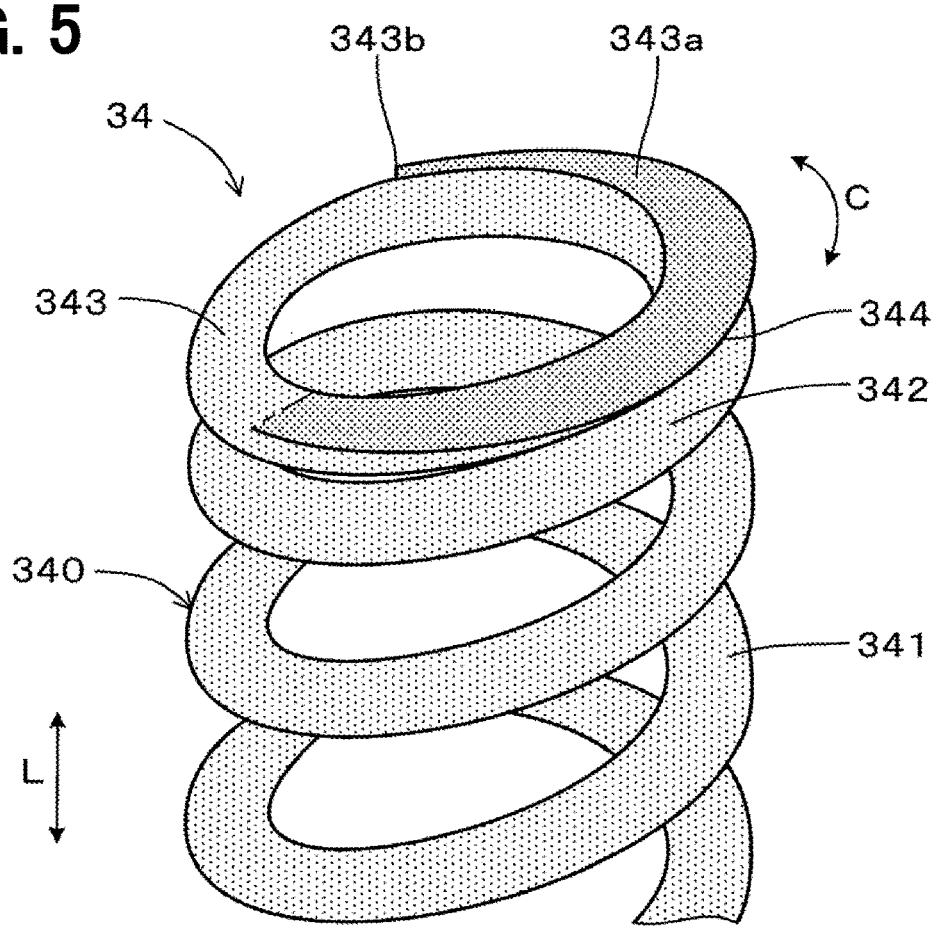
FIG. 5 is a perspective view illustrating the valve-side spring according to the embodiment.

The valve-side spring 34 is sandwiched between the valve guide 32 and the valve 33 and biases the valve 33 in a direction to close the sealing passage 311. A wire element 340 in a spiral form forms the valve-side spring 34. The wire element 340 in the spiral form has outer surfaces as flat surfaces 343a at both ends in an axial direction L of the wire element 340 in the spiral form. As shown in FIGS. 4 and 5, at each of the ends of the valve-side spring 34 in the axial direction L, a pitch P1 between an outer wire portion 343 and an adjacent wire portion 342, which is adjacent to the outer wire portion 343, is smaller than a pitch P between regular wire portions 341 in the wire element 340. The regular wire portions 341 are other than the outer wire portion 343 and the adjacent wire portion 342. In this configuration, the outer wire portion 343 and the adjacent wire portion 342 are in line contact with each other in a circumferential direction C.

Hereinafter, the sealing valve 3 of the evaporated fuel processing apparatus 1 of the present embodiment will be described in detail. As shown in FIG. 1, in the vehicle 6, the fuel vapor processing apparatus 1 is used such that the evaporated fuel F1, which is part of the gas phase K in the fuel tank 62, is not released to the atmosphere when fuel F is supplied to the fuel tank 62. The evaporated fuel F1 is stored in the canister 2 and then discharged to an intake pipe 611 of the internal combustion engine 61, or is directly discharged to the intake pipe 611 of the internal combustion engine 61 through the canister 2. Then, the fuel component of the evaporated fuel F1 is used for combustion in the internal combustion engine 61.

The flow rate of combustion air A supplied from the intake pipe 611 to the internal combustion engine 61 is adjusted by operating a throttle valve 612 provided in the intake pipe 611. The internal combustion engine 61 is provided with a fuel injection device 63 that injects fuel F supplied from the fuel tank 62. The fuel vapor processing apparatus 1 includes the canister 2, the first purge pipe 41, the sealing valve 3, a second purge pipe 42, and a purge valve 43. The second purge pipe 42 connects the canister 2 with the intake pipe 611 of the internal combustion engine 61. The purge valve 43 is for opening and closing the second purge pipe 42.

(Canister)

As shown in FIG. 1, the canister 2 includes a case 21 and an adsorbent 22 such as activated carbon. The adsorbent is in the case 21 and adsorbs the evaporated fuel (i. e., fuel vapor) F1. The case 21 of the canister 2 includes an inlet 211, an outlet 212, and a pressure release port 213. The inlet 211 is connected to the first purge pipe 41 and allows evaporated fuel F1 to enter. The outlet 212 is connected to the second purge pipe 42 and allows fuel components to exit. The pressure release port 213 is openable to the atmosphere. An open-close valve 23 for opening and closing the pressure release port 213 is provided at the pressure release port 213. When purging (exhausting) evaporated fuel F1 from the gas phase K in the fuel tank 62 to the canister 2, the open-close valve 23 opens the pressure release port 213 to the atmosphere. Subsequently, in the canister 2, the fuel components in the evaporated fuel F1 are adsorbed by the adsorbent 22, while the pressure in the canister 2 becomes equal to the atmospheric pressure.

The fuel components adsorbed by the adsorbent 22 of the canister 2 pass through the second purge pipe 42 and are discharged to the intake pipe 611 of the internal combustion engine 61. At this time, the pressure release port 213 of the canister 2 is opened to the atmosphere, and the second purge pipe 42 is opened by the purge valve 43. The fuel components adsorbed by the adsorbent 22 are discharged to the intake pipe 611 of the internal combustion engine 61 by an airflow caused due to the pressure difference between the pressure of the atmosphere entering the canister 2 through the pressure release port 213 and the negative pressure in the intake pipe 611.

(Fuel Tank)

As shown in FIG. 1, the fuel tank 62 stores the fuel F used for the combustion of the internal combustion engine 61. The fuel tank 62 includes a fuel supply port 621, a fuel pump 623, and a purge port 622. The fuel supply port 621 is used to receive fuel F supplied to the fuel tank 62 from the outside. The fuel pump 623 is used when supplying the fuel F to the fuel injection device 63 of the internal combustion engine 61. The purge port 622 is connected to the first purge pipe 41.

(Purge Valve)

As shown in the same drawing, the purge valve 43 is configured to open the second purge pipe 42 when purging (discharging) the fuel component adsorbed by the adsorbent 22 of the canister 2 to the intake pipe 611 of the internal combustion engine 61 and when purging (discharging) the evaporated fuel F1 in the gas phase K of the fuel tank 62 to the intake pipe 611 of the internal combustion engine 61.

(Axial Direction)

The axial direction L of the valve-side spring 34 is parallel to the direction in which the valve 33 opens and closes the sealing passage 311. In the sealing valve 3, the axial directions L of the valve guide 32 and the valve 33 are the same as the axial direction L of the valve-side spring 34. In the axial direction L of the sealing valve 3, the side of the sealing valve 3 on which the stepping motor 35 is placed is referred to as a proximal end side L2, and the side of the sealing valve 3 on which the sealing passage 311 is closed by the valve 33 is referred to as a distal end side L1.

(Housing of Sealing Valve)

As shown in FIGS. 2 and 3, the housing 31 includes an accommodation hole 310 for housing the valve guide 32 and the sealing passage 311 which is in communication with the accommodation hole 310. The accommodation hole 310 is formed in a proximal end side L2 along the axial direction L of the housing 31. The sealing passage 311 includes an inflow portion 312 and an outflow portion 314. The inflow portion 312 is connected to the fuel tank 62. The evaporated fuel F1 flows in through the inflow portion 312. Further, the evaporated fuel F1 flows out through the outflow portion 314 to the canister 2. The inflow portion 312 is formed parallel to the accommodation hole 310 at the distal end side L1 of the accommodation hole 310, and the outflow portion 314 is formed perpendicular to the accommodation hole 310.

(Valve Guide)

As shown in the same drawings, the valve guide 32 includes a center shaft portion 321, a guide disc portion 322, a guide tubular portion 323, and an engaging portion 323a. The center shaft portion 321 is fixed to an output shaft 351 of the stepping motor 35. The guide disk portion 322 is formed around the center shaft portion 321. The guide tubular portion 323 is formed in a cylindrical shape protruding from the peripheral portions of the guide disk portion 322. The engaging portion 323a is formed on the inner peripheral surface of the guide tubular portion 323 to lock the valve 33. A male screw threading 352 is formed on the outer surface of the output shaft 351 of the stepping motor 35. A hollow hole 321a is formed at the center of the center shaft portion 321 of the valve guide 32, and a female screw threading 321b is formed on the inner surface of a hollow hole 321a. The female screw threading 321b is screwed together with the male screw threading 352 of the output shaft 351 of the stepping motor 35. The engaging portion 323a is formed as a protruding portion that protrudes inward from the inner peripheral surface of the guide tubular portion 323. The main body of the stepping motor 35 is fixed to the housing 31.

(Valve)

As shown in FIGS. 2 and 3, the valve 33 includes a valve tubular portion 331, a valve closing plate portion 332, and a sealing member 333. The valve tubular portion 331 is placed inside the guide tubular portion 323 of the valve guide 32. Further, the valve tubular portion 331 includes an engaging protrusion 331a configured to lock with the engaging portion 323a of the valve guide 32. The valve closing plate portion 332 closes the end portion of the valve tubular portion 331. The sealing member 333 is a ring-shaped member placed on the valve closing plate portion 332. The sealing member 333 is configured to close an opening portion 313 of the sealing passage 311. The valve tubular portion 331 is formed in a cylindrical shape and guides the outer periphery of the valve-side spring 34. The engaging protrusion 331a is formed so as to protrude radially outward from an end portion of the valve tubular portion 331 on the proximal end side L2 in the axial direction L.

The valve closing plate portion 332 and the engaging protrusion 331a are guided in the axial direction L by the inner circumference of the guide tubular portion 323 of the valve guide 32. The surface of the proximal end side L2 of the valve closing plate portion 332 in the axial direction L is in contact with a flat surface 343a of the outer wire portion 343 of the valve side spring 34 on the distal end side L1 in the axial direction L.

The sealing member 333 is arranged in the housing 31 at the periphery of the opening portion 313 of the inflow portion 312 of the sealing passage 311. A sealing portion 333a is formed in the housing 31 on the distal end side L1 of the sealing member 333 in the axial direction. The sealing portion 333a is configured to elastically deform when coming into contact with the peripheral portion of the opening portion 313 of the inflow portion 312 of the sealing passage 311. The position of the distal end side L1 of the entirety of the sealing portion 333a in the axial direction L is within an imaginary plane parallel to the surface of the valve closing plate portion 332 on the proximal end side L2 in the axial direction L.

The valve 33 is biased toward the distal side L1 in the axial direction L by the valve-side spring 34, and the engaging protrusion 331a of the valve tubular portion 331 of the valve 33 engages with the engaging portion 323a of the guide tubular portion 323 of the valve guide 32. Due to this, the valve 33 is retained within the valve guide 32. As shown in FIGS. 2 and 3, the valve 33 is movable between a closed position 301 and an open position 302. Specifically, the valve 33 is normally in the closed position 301 due to being biased by the valve-side spring 34 to close the sealing passage 311. Further, the valve 33 is configured to be moved toward the open position 302 in accordance with a movement amount of the valve guide 32 toward the proximal end side L2 in the axial direction L. The open position 302 determines the opening degree of the sealing passage 311.

As shown in FIG. 2, the opening portion 313 of the inflow portion 312 of the sealing passage 311 is normally closed by the sealing portion 333a of the sealing member 333 of the valve 33. In this state, the valve-side spring 34 is in a compressed state and applies a spring force on the valve closing plate portion 332 toward the distal side L1 in the axial direction L. At the same time, the evaporated fuel F1 in the inflow portion 312 exerts a fuel pressure on the valve closing plate portion 332 toward the proximal end side L2 in the axial direction L. In the state shown in FIG. 2, the spring force is greater than the fuel pressure. As a result, the valve 33 is maintained at the closed position 301, and the sealing passage 311 is maintained in a closed state.

On the other hand, as shown in FIG. 3, when the valve guide 32 is moved by the stepping motor 35 toward the proximal end side L2 in the axial direction L in order to open the opening portion 313 of the inflow portion 312 of the sealing passage 311, the valve 33 and the valve-side spring 34 are also moved toward the proximal end side L2 in the axial direction L. As a result, the sealing portion 333a of the sealing member 333 of the valve 33 separates from the peripheral edge of the opening portion 313 of the inflow portion 312 of the sealing passage 311 in the housing 31, and the valve 33 moves to the open position 302, and the sealing passage 311 is opened. In this manner, the amount by which the valve guide 32, the valve 33, and the valve-side spring 34 move toward the proximal end side L2 in the axial direction L is determined according to the number of step by which the stepping motor 35 is energized. Thus, the opening amount of the sealing passage 311 is quantitatively determined.

(Valve-Side Spring)

As shown in FIGS. 4 and 5, the valve-side spring 34 includes a compression coil spring (torsion coil spring) which is formed by winding a round wire in the spiral form. The round wire is the wire element 340. The valve-side spring 34 applies a predetermined biasing force to the valve 33 to close the sealing passage 311 and to retain the valve 33 at the closed position 301 by application of the biasing force. The valve-side spring 34 includes a regular wire portion 341, the adjacent wire portion 342, and the outer wire portion 343. In the regular wire portion 341, a pitch P is constant. The pitch P indicates an amount of shift in the axial direction L for each round of the wire element 340. In the adjacent wire portion 342 and the outer wire portion 343, the pitch P1 is reduced compared with the pitch P of the regular wire portion 341 at the ends of both sides L1 and L2, respectively, in the axial direction L of the regular wire portion 341. In other words, the pitch P of the valve-side spring 34 is the smallest at the portion between the adjacent wire portion 342 and the outer wire portion 343. The adjacent wire portion 342 is in line contact with the outer wire portion 343 in the circumferential direction C. A contact portion 344, at which the outer wire portion 343 and the adjacent wire portion 342 are in contact with each other, is formed in a predetermined formation angular range in the circumferential direction C from a distal end side 343b of the outer wire portion 343 in the circumferential direction C. In FIG. 5, the entirety of the valve-side spring 34 is shown by a thin dot hatching, and the flat surface 343a is shown by a bold dot hatching.

The outer wire portion 343 is an outermost wire portion at each end of the valve-side spring 34 and is formed in a range of 360° (one round) in the circumferential direction C. The adjacent wire portion 342 is adjacent to the outer wire portion 343 and is formed in a range of 360° (one round) in the circumferential direction C. The pitch P1 between the adjacent wire portion 342 and the outer wire portion 343 may be varied so as to decrease toward the distal end side L1 in the axial direction L. The pitch P1 between the adjacent wire portion 342 and the outer wire portion 343 may be varied stepwise partially in the circumferential direction C, such that the pitch P1 of the portion located on the distal side L1 in the axial direction L is smaller than the pitch P1 of the portion located on the proximal end side L2 in the axial direction L.

The valve-side spring 34 does not include a wire portion, which is perpendicular to the axial direction L, at each of both the ends in the axial direction L. The portions of the wire elements 340 in the spiral form located at both ends of the valve-side spring 34 in the axial direction L are inclined with respect to a plane perpendicular to the axial direction L. Therefore, the flat surfaces 343a are formed in the wire elements 340 in the spiral form, respectively, at both ends of the valve-side spring 34 in the axial direction L, such that the valve-side spring 34 does not tilt with respect to the surface perpendicular to the axial direction L.

As shown in FIGS. 2 and 3, the flat surfaces 343a at both ends of the valve-side spring 34 are formed, such that the distal ends of the outer wire portions 343 in the circumferential direction C are partially shaved by being polished (ground) from both sides L1 and L2 in the axial direction L. The flat surfaces 343a are formed to be orthogonal to the axial direction L. The valve-side spring 34 is compressed between the guide disk portion 322 of the valve guide 32 and the valve closing plate portion 332 of the valve 33 and is sandwiched between the guide disk portion 322 and the valve closing plate portion 332 so as to be resiliently deformed in the axial direction L. The flat surface 343a of the valve-side spring 34 on the distal end side L1 in the axial direction L is in contact with the valve closing plate portion 332, and the flat surface 343a of the valve-side spring 34 on the proximal end side L2 in the axial direction L is in contact with the guide disk portion 322.

Figure 6:
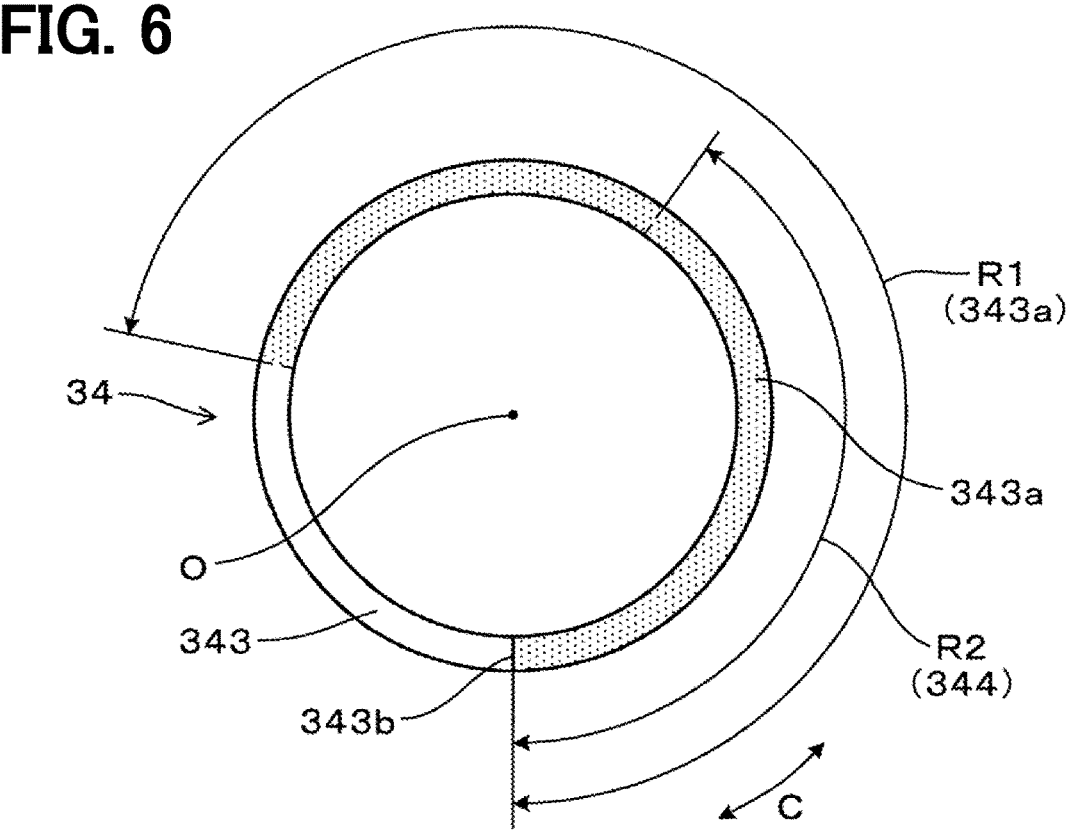
FIG. 6 is an explanatory view showing the valve-side spring according to the embodiment when viewed along an axial direction.

As shown in FIG. 6, the flat surfaces 343a of the outer wire portions 343 on both sides L1 and L2 in the axial direction L of the valve-side spring 34 are formed in a formation angular range R1, which is 180° or more and less than 360°, in the circumferential direction C of the valve-side spring 34 from the distal ends 343b of the wire element 340, that is, from the outer wire portions 343, respectively. Each of the adjacent wire portion 342 and the outer wire portion 343 is formed in a spiral shape. The flat surface 343a is formed on the outer wire portion 343, and therefore, the thickness of the outer wire portion 343 in the axial direction L is reduced toward the outside in the axial direction L. The flat surface 343a is formed in the range R1 of 180° or more in the circumferential direction C, thereby to enable the outer wire portion 343 of the valve-side spring 34 to be easily in surface contact perpendicularly to corresponding one of the valve closing plate portion 332 and the guide disk portion 322. The outer wire portion 343 is formed in the spiral shape, and a formation angular range R1 of the flat surface 343a in the circumferential direction C is less than 360°.

The contact portion 344, at which the outer wire portion 343 and the adjacent wire portion 342 are in contact with each other, is formed in a formation angular range R2, which is 10° or more and is less than 360° in the circumferential direction C. The range R2 is smaller than the formation angle R1 of the flat surface 343a. In a case where the formation angle of the contact portion 344 is less than 10°, the adjacent wire portion 342 may not be able to sufficiently support the portion of the outer wire portion 343 having the reduced thickness in the axial direction L. The adjacent wire portion 342 is a wire portion adjacent to the outer wire portion 343. The formation angular range R2 of the contact portion 344 in the circumferential direction C is less than 360°. The formation angular range R2 may be greater than the formation angle R1.

The formation angular range R1 of the flat surface 343a in the circumferential direction C varies depending on the size of the pitch P of the outer wire portions 343. As the pitch P of the outer wire portions 343 increases, the formation angular range R1 of the flat surface 343a in the circumferential direction C decreases. As the pitch P of the outer wire portions 343 decreases, the formation angular range R1 of the flat surface 343a in the circumferential direction C increases.

In order to ensure the minimum thickness of the outer wire portion 343 of the valve-side spring 34 in the axial direction L, the flat surface 343a may be formed in the formation angular range R1, which is 180° or more and less than 270°, in the circumferential direction C of the valve-side spring 34. Further, in this configuration, the flat surface 343a is formed in the half round or more. Therefore, this configuration enables to appropriately ensure the area of the valve-side spring 34 that is in contact with the contact surface of the guide disk portion 322 of the valve guide 32 or the contact surface of the valve closing plate portion 332 of the valve 33.

In order to enhance balance of the biasing force of the valve-side spring 34 in the circumferential direction C, the contact portion 344 may be formed in the formation angular range R2 of 20° or more and less than 180° in the circumferential direction C. More specifically, the contact portion 344 may be formed in the formation angular range R2 of 45° or more and less than 180° in the circumferential direction C.

FIG. 6 shows a configuration in which the flat surface 343a is formed in the formation angular range R1 of 180° or more and less than 270° in the circumferential direction C and in which the contact portion 344 is formed in the formation angular range R2 of 20° or more and less than 180° in the circumferential direction C. In the drawing, the formation angular range R1 of the flat surface 343a in the circumferential direction C is shown by a thin dot hatching.

Figure 7:
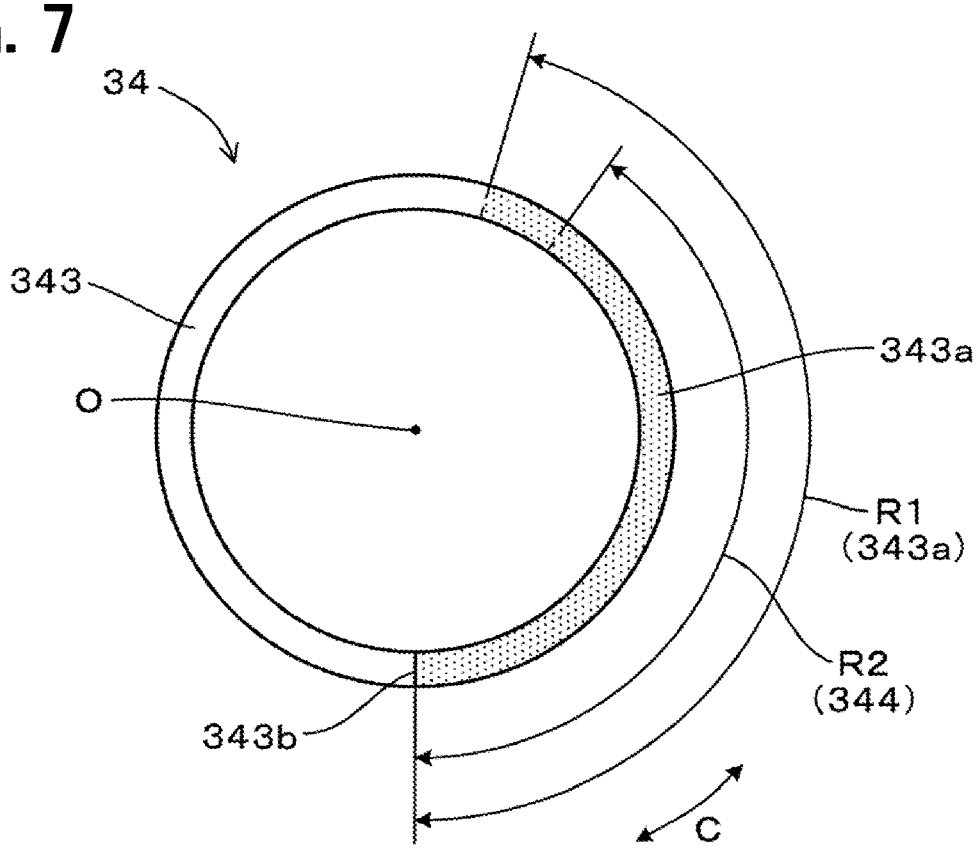
FIG. 7 is an explanatory view showing another valve-side spring according to the embodiment when viewed along an axial direction.

FIG. 7 shows a configuration in which the flat surface 343a and the contact portion 344 are formed respectively in the formation angular ranges R1 and R2 of 90° or more and less than 180° in the circumferential direction C. In the drawing, the formation angular range R1 of the flat surface 343a in the circumferential direction C is shown by a thin dot hatching.

(Guide-Side Spring)

As shown in FIGS. 2 and 3, a guide-side spring 36 is provided to the outer periphery of the valve guide 32 for reducing backlash caused between the output shaft 351 of the stepping motor 35 and the valve guide 32. The guide-side spring 36 is arranged around the outer circumference of the guide tubular portion 323 of the valve guide 32. The guide-side spring 36 is interposed between a step portion 323b, which is formed on the guide tubular portion 323, and the peripheral edge of the opening portion 313 of the inflow portion 312 of the sealing passage 311 in the housing 31. The guide-side spring 36 includes a compression coil spring (torsion coil spring) formed by winding a round wire (wire element) in the spiral form.

The valve guide 32 is biased by the guide-side spring 36 to the proximal end side L2 in the axial direction L, and therefore, a gap between the male screw threading 352 of the output shaft 351 of the stepping motor 35 and the female screw threading 321b of the central hole of the center shaft portion 321 of the valve guide 32 is held on one side in the axial direction L. Thus, when the output shaft 351 of the stepping motor 35 rotates, backlash between the output shaft 351 and the valve guide 32 in the axial direction L is reduced.

(Control Device)

As shown in FIG. 1, the fuel vapor processing apparatus 1 is configured to operate in response to a command from a control device 5 of the vehicle 6. The sealing valve 3, the purge valve 43, and the open-close valve 23 are connected to the control device 5 of the vehicle 6 and are configured to open and close in response to a command from the control device 5. When energization by a predetermined number of steps is made by the control device 5 on the stepping motor 35 of the sealing valve 3, the valve 33 opens the opening portion 313 of the sealing passage 311.

(Operation of Sealing Valve)

When the sealing valve 3 closes the sealing passage 311 of the housing 31, the first purge pipe 41 from the fuel tank 62 to the canister 2 is closed, and pressure of gas such as vapor fuel F and air in the gas phase K is maintained in the fuel tank 62. When gas in the gas phase K in the fuel tank 62 is extracted into the canister 2 before refueling the fuel tank 62, the control device 5 opens the first purge pipe 41 by the sealing valve 3 and opens the pressure release port 213 of the canister 2 by the open-close valve 23. At this time, gas in the fuel tank 62 flows into the canister 2 due to pressure difference between pressure of the evaporated fuel F1 and the like in the fuel tank 62 and pressure (atmospheric pressure) in the canister 2. As a result, a fuel component of the evaporated fuel F1 contained in the gas is adsorbed by the adsorbent 22 in the canister 2.

When the internal combustion engine 61 implements a combustion, the control device 5 opens the pressure release port 213 of the canister 2 by the open-close valve 23 and opens the second purge pipe 42 by the purge valve 43. At this time, the canister 2 is connected to the intake pipe 611 of the internal combustion engine 61 via the second purge pipe 42. The fuel component in the adsorbent 22 flows into the intake pipe 611 due to the difference between the pressure in the canister 2 (atmospheric pressure) and the pressure in the intake pipe 611 of the internal combustion engine 61. The fuel component released from the adsorbent 22 is used for the combustion of the internal combustion engine 61 together with the fuel F injected into the internal combustion engine 61.

Further, when pressure of gas in the fuel tank 62 rises during the internal combustion engine 61 implements combustion, the control device 5 opens the first purge pipe 41 by using the sealing valve 3, opens the pressure release port 213 of the canister 2 by using the open-close valve 23, and opens the second purge passage by using the purge valve 43. Gas in the fuel tank 62 flows into the canister 2 due to the difference between the pressure of the evaporated fuel F1 or the like in the fuel tank 62 and the pressure in the canister 2 (atmospheric pressure). The gas further flows into the intake pipe 611 due to the difference between the pressure in the canister 2 and the pressure in the intake pipe 611. The gas extracted from the fuel tank 62 is used in the combustion of the internal combustion engine 61 together with the fuel F injected into the internal combustion engine 61.

(Operation Effect)

In the sealing valve 3 of the evaporated fuel processing apparatus 1 according to the embodiment, the valve-side spring 34 having the shape enables to more reliably seal the sealing passage 311 by using the valve 33. Specifically, in the wire element 340 in the spiral form that forms the valve-side spring 34, the outer surface of the outer wire portion 343 located at each of both the ends in the axial direction is the flat surface 343a orthogonal to the axial direction L. Due to the formation of the flat surface 343a, the thickness of the portion of the outer wire portion 343, in which the flat surface 343a is formed (formation angular range R1), is thinner than the thickness of the portion of the outer wire portion 343 in the axial direction L, in which the flat surface 343a is not formed.

Therefore, in the valve-side spring 34, the pitch P1 between the outer wire portion 343 and the adjacent wire portion 342 is smaller than the pitch P of the regular wire portions 341, so that the outer wire portion 343 linearly abuts, i. e., are in line contact with the adjacent wire portion 342 in the circumferential direction C. In the portion, in which the flat surface 343a is formed in the outer wire portion 343 in the circumferential direction C, the outer wire portion 343 and the adjacent wire portion 342 stacked one another in the axial direction L. This configuration alleviates occurrence of variation in the spring constant in portions of the valve-side spring 34 in the circumferential direction C. Thus, when the valve-side spring 34 is compressed, this configuration enables to reduce variation in the biasing force, which is applied to the valve 33 from portions of the valve-side spring 34 in the circumferential direction C.

Therefore, the configuration enables to restrict the valve 33, which receives the biasing force of the valve-side spring 34, from tilting with respect to the axial direction L of the valve guide 32. In this way, the configuration enables to maintain the position of the valve 33 arranged in parallel with the valve guide 32. When the valve 33 is in the closed position 301, the configuration enables to restrict part of the sealing portion 333a of the valve 33 in the circumferential direction C from separating from the peripheral edge of the opening portion 313 of the sealing passage 311.

In addition, when the valve 33 starts moving from the closed position 301 to the open position 302, the entirety of the circumference of the sealing portion 333a of the sealing member 333 of the valve 33 in the circumferential direction C can be separated at the same time from the peripheral edge of the opening portion 313 of the sealing passage 311. In this way, the configuration enables the quantitative control of the opening amount of the sealing passage 311 with accuracy by using the valve 33.

The outer wire portion 343 is in contact with the adjacent strand portion 342 within the formation angular range R2 that is 10° or more and is less than 180° in the circumferential direction C. This configuration enables to set the formation angular range R2, in which the outer wire portion 343 contacts the adjacent wire portion 342, appropriately and thereby to enable to restrict the valve 33 from tilting with respect to the axial direction L.

Therefore, the sealing valve 3 of the evaporated fuel processing apparatus 1 of the present embodiment enables to further reliably seal the sealing passage 311 by using the valve 33.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A sealing valve for a fuel vapor processing apparatus provided in a vehicle, the vehicle including an internal combustion engine and a fuel tank, the fuel vapor processing apparatus including a canister configured to adsorb evaporated fuel evaporated in the fuel tank, the sealing valve configured to be provided in a purge pipe that connects the fuel tank to the canister, the sealing valve comprising:

a housing;

a valve guide configured to convert a rotational force of an actuator into a propulsive force and to move back and forth relative to the housing;

a valve connected to the purge pipe and configured to engage with and to slide on the valve guide to open and close a sealing passage of the housing; and a valve-side spring sandwiched between the valve guide and the valve and configured to bias the valve in a direction to close the sealing passage, wherein the valve-side spring includes a wire element that is in a spiral form and has outer wire portions located at both ends in an axial direction, respectively, each of the outer wire portions has an outer surface located at a distal end in the axial direction and defining a flat surface that is orthogonal to the axial direction, a pitch between the outer wire portion and an adjacent wire portion, which is adjacent to the outer wire portion, is smaller than a pitch between regular wire portions of the wire element, which are other than the outer wire portion and an adjacent wire portion, in at least one end of the valve-side spring in the axial direction, the outer wire portion and the adjacent strand portion are in line contact with each other in a circumferential direction;

the flat surface is in a first angular range that is 180° or more and is less than 360° in the circumferential direction of the valve-side spring;

the outer wire portion and the adjacent wire portion are in contact with each other via a contact portion that is in a second angular range smaller than the first angular range of the flat surface, and the second angular range is 10° or more and is less than 360° in the circumferential direction.

2. A sealing valve for a fuel vapor processing apparatus provided in a vehicle, the vehicle including an internal combustion engine and a fuel tank, the fuel vapor processing apparatus including a canister configured to adsorb evaporated fuel evaporated in the fuel tank, the sealing valve configured to be provided in a purge pipe that connects the fuel tank to the canister, the sealing valve comprising:

a housing;

a valve guide configured to convert a rotational force of an actuator into a propulsive force and to move back and forth relative to the housing;

a valve connected to the purge pipe and configured to engage with and to slide on the valve guide to open and close a sealing passage of the housing; and a valve-side spring sandwiched between the valve guide and the valve and configured to bias the valve in a direction to close the sealing passage, wherein the valve-side spring includes a wire element that is in a spiral form and has outer wire portions located at both ends in an axial-direction, respectively, each of the outer wire portions has an outer surface located at a distal end in the axial direction and defining a flat surface that is orthogonal to the axial direction, a pitch between the outer wire portion and an adjacent wire portion, which is adjacent to the outer wire portion, is smaller than a pitch between regular wire portions of the wire element, which are other than the outer wire portion and an adjacent wire portion, in at least one end of the valve-side spring in the axial direction, and the outer wire portion and the adjacent strand portion are in line contact with each other in circumferential direction, the valve guide includes a center shaft portion, a guide disc portion, a guide tubular portion, and an engaging portion, the center shaft portion is screwed with an output shaft of a stepping motor that is the actuator, the guide disc portion is placed around the center shaft portion, the guide tubular portion is in a tubular shape and projects from a periphery of the guide disc portion, the engaging portion is on an inner peripheral surface of the guide tubular portion and is configured to engage with the valve, the valve includes a valve tubular portion, a valve closing plate portion, and a sealing member, the valve tubular portion is placed on a radially inside of the guide tubular portion and has an engaging protrusion configured to engage with the engaging portion, the valve closing plate portion closes an end portion of the valve tubular portion, the sealing member is in a ring shape and is provided to the valve closing plate portion to seal an opening portion of the sealing passage, the valve-side spring is resiliently deformed and is sandwiched between the guide disc portion and the valve closing plate portion, the valve guide has an outer circumference provided with a guide-side spring, the guide-side spring is in the housing and is interposed between the guide tubular portion and a periphery of the opening of the passage, and the guide-side spring is configured to reduce backlash caused between the output shaft of the stepping motor and the valve guide.

3. A sealing valve for a fuel vapor processing apparatus provided in a vehicle, the vehicle including an internal combustion engine and a fuel tank, the fuel vapor processing apparatus including a canister configured to adsorb evaporated fuel evaporated in the fuel tank, the sealing valve configured to be provided in a purge pipe that connects the fuel tank to the canister, the sealing valve comprising:

a housing;

a valve guide configured to convert a rotational force of an actuator into a propulsive force and to move back and forth relative to the housing;

a valve connected to the purge pipe and configured to engage with and to slide on the valve guide to open and close a sealing passage of the housing; and a valve-side spring sandwiched between the valve guide and the valve and configured to bias the valve in a direction to close the sealing passage, wherein the valve-side spring includes a wire element that is in a spiral form and has outer wire portions located at both ends in an axial direction, respectively, each of the outer wire portions has an outer surface located at a distal end in the axial direction and defining a flat surface that is orthogonal to the axial direction, a pitch between the outer wire portion and an adjacent wire portion, which is adjacent to the outer wire portion, is smaller than a pitch between regular wire portions of the wire element, which are other than the outer wire portion and an adjacent wire portion, in at least one end of the valve-side spring in the axial direction, the outer wire portion and the adjacent strand portion are in line contact with each other in a circumferential direction, the flat surface is in a first angular range that is 180° or more and is less than 360° in the circumferential direction of the valve-side spring, the outer wire portion and the adjacent wire portion are in contact with each other via a contact portion that is in a second angular range larger than the first angular range of the flat surface, and the second angular range is 10° or more and is less than 360° in the circumferential direction.

* * * * *